(No Model.)
G. R. ROGERS.
OPERATING DEVICE FOR BRAKES.
No. 464,724. Patented Dec. 8, 1891.
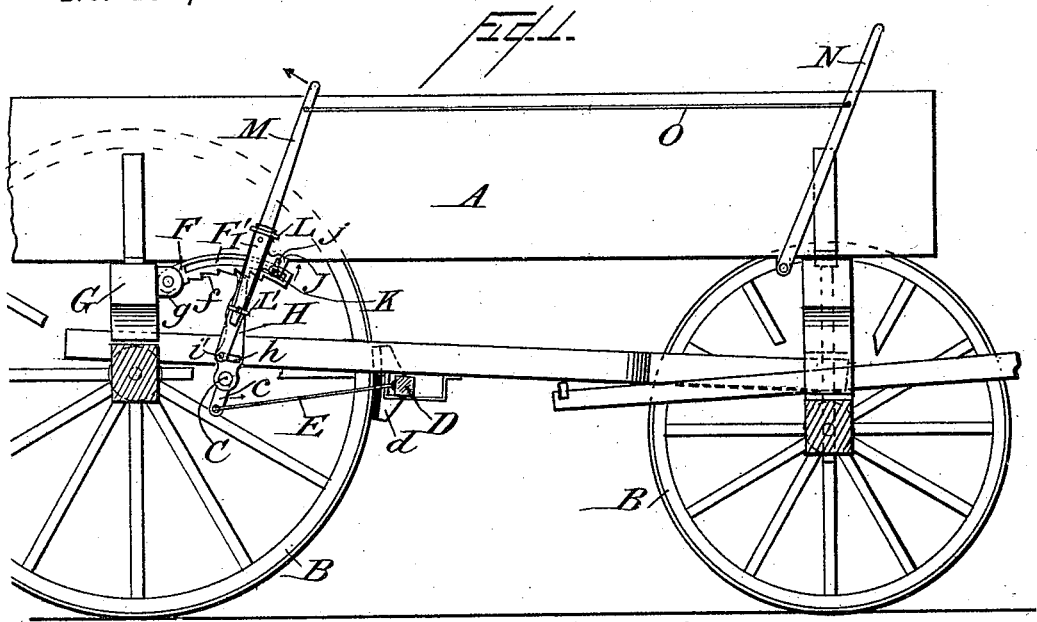
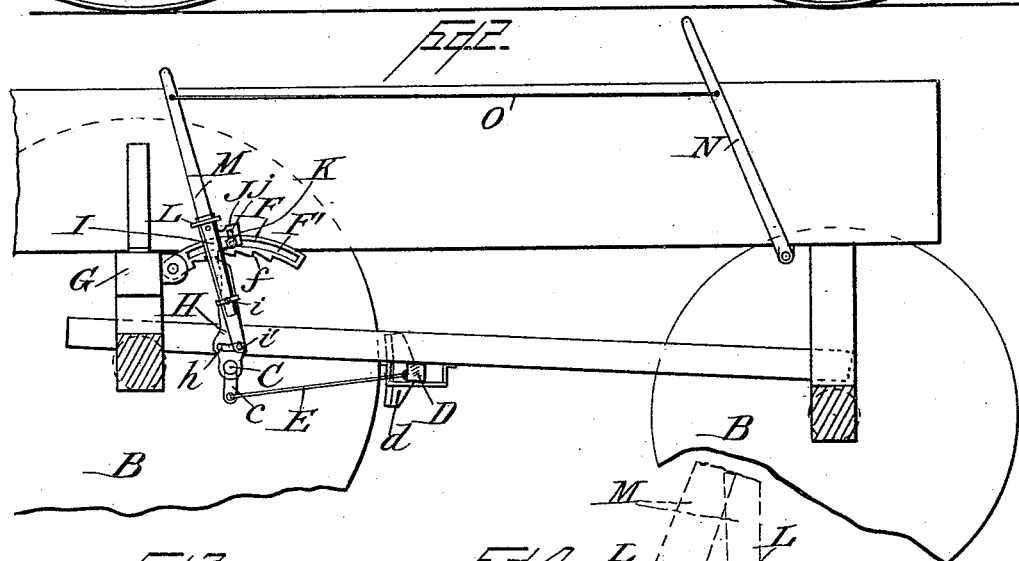
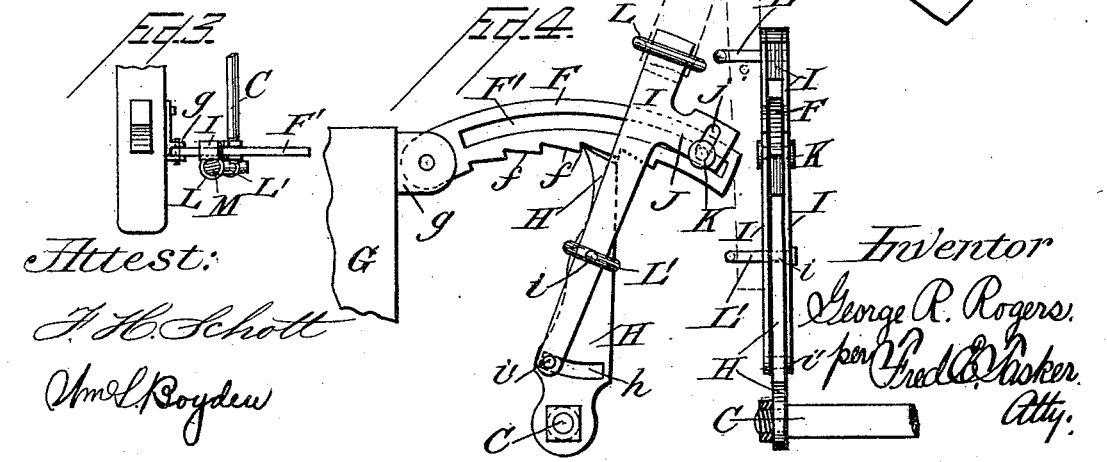
Attest:
F. H. Schott
Wm. L. Boyden
Inventor
George R. Rogers.
per Fred C. Tasker.
Atty.

UNITED STATES PATENT OFFICE.

GEORGE R. ROGERS, OF PARKERSBURG, INDIANA, ASSIGNOR OF TWO-THIRDS TO T. W. HESTER, DAVID C. MILLER, E. W. FOSTER, J. W. OWENS, AND W. B. SHANNON, OF SAME PLACE, AND WILLIAM H. HICKS, OF PAWNEE, INDIANA.

OPERATING DEVICE FOR BRAKES.

SPECIFICATION forming part of Letters Patent No. 464,724, dated December 8, 1891.

Application filed September 10, 1891. Serial No. 405,309. (No model.)

*To all whom it may concern:*

Be it known that I, GEORGE R. ROGERS, a citizen of the United States, residing at Parkersburg, in the county of Montgomery and State of Indiana, have invented certain new and useful Improvements in Operating and Locking Devices for Vehicle-Brakes and the Like; and I do hereby declare the following to be a full, clear, and exact description of the invention, such as will enable others skilled in the art to which it appertains to make and use the same.

My invention relates to an improvement in brake-operating devices for vehicles, although the mechanism which constitutes the improvement is susceptible of various different applications, the object being to provide a simple and efficient locking contrivance for the brake mechanism of a vehicle or for analogous purposes; and it therefore consists in the construction, arrangement, and combination of the several parts, substantially as will be hereinafter described and claimed.

In the annexed drawings, illustrating my invention, Figure 1 is a side elevation of a vehicle provided with my improved brake-locking device, the parts of the same being shown in the locked position. Fig. 2 is a similar side elevation of a portion of a vehicle provided with my improvements, the parts of which are shown in the unlocked position. Fig. 3 is a detail plan view of my improved devices. Fig. 4 represents an enlarged side elevation and also an edge view of the same.

Similar letters of reference designate corresponding parts throughout all the different figures of the drawings.

C designates a horizontal rock-shaft, which is supported in suitable bearings transversely beneath a vehicle or in some analogous situation, said shaft being provided with the arm C, to which is pivotally connected a rod E, the other end of which is movably connected to a transverse brake-beam D, which carries the shoes $d$ $d$, adapted to operate against the wheels B of the vehicle A, said vehicle, as represented in the drawings, being taken as an example merely in order to illustrate the practical application of my present improvements.

H designates a vertical pawl-arm having its upper end suitably pointed and secured at its lower end rigidly to the horizontal rock-shaft C. The upper end of this pawl-arm H engages the teeth $f$, formed on the lower edge of the toothed pivotal segment F, said segment being pivoted to a projection $g$ on the bolster G of the vehicle. The toothed segment F is also provided with a curved longitudinal slot F'. A slotted or forked plate or bar I embraces the pivoted segment F and also the pawl-arm H and is pivoted to the latter. This slotted or forked bar consists, simply, of two parallel parts, which lie on each side of the segment and also on each side of the pawl-arm, it being remembered that the pawl-arm is situated vertically below the segment, with its upper end engaging the teeth on the lower edge thereof. This slotted bar I is pivoted by means of a pivot $i$ to the pawl-arm H near the upper end thereof, and it is provided near its extreme lower end with a horizontal pin $i'$, which passes through a slightly-curved slot $h$, formed in the upper arm H. Thus it will be seen that the slotted bar I may have a movement relative to the arm H, said movement taking place upon the pivot $i$ and being limited in extent by the length of slot $h$. The slotted bar I, furthermore, has near its upper end an extension J, which is slotted at $j$, and in this slot $j$ is supported a pin K, which extends through the curved slot F' in the pivoted segment F. It will thus be clearly seen that the pin K may have a movement along a horizontal curve in the slot F', and also may have an up-and-down movement in the slot $j$. The slotted bar F is also provided with two or more horizontal rings L L', the ring L' being preferably formed integral with the pivot $i$—that is to say, said pivot is simply one end of the ring L'. These rings L and L' are simply for the purpose of receiving and holding a lever-arm L, which extends upward alongside the body of the vehicle in convenient position to be easily grasped and manipulated by the rider or operator for the purpose of actuating the brake mechanism and locking or unlocking the same. I reserve the liberty, however, of varying very greatly in the form and connection of the handle-lever. In the present example of hand-lever m I have found it convenient to connect it with the slotted bar I by the rings just described; but said rings may be dispensed with, if desired, and any other mode of connection adopted instead, or the lever may be made integral with the part I.

The brake-locking mechanism which I have just described may be located at any suitable part of the vehicle. I preferably arrange it near the rear end thereof, in which case it is generally advisable to mount the pivoted lever N on the vehicle-body, near the front portion thereof, and connect said arm with the other arm M by means of a link O. Thus I provide a lever N at the front end of the vehicle, whereby the mechanism may be operated from that point.

The pivoted segment F, as has been noted, is capable of oscillation upon its pivot. When the upper end of the pawl-arm H moves forwardly, it engages the teeth $f$ in succession and slips easily from one to the other, but of course cannot become disengaged therefrom until the segment F is lifted vertically to allow of such disengagement to permit a return or backward movement of the arm H. When therefore it is desired to lock the brake mechanism, the operator will force the lever M or the lever N, as the case may be, toward the right in the position shown in Fig. 1, and the engagement of the segment F with the upper end of the arm H will hold the parts in the position in which they may thus be placed.

When it is desired to unlock the mechanism and release the brake, all that the operator has to do is to throw the lever M or the lever N toward the left. By throwing either of said levers toward the left the result will be to throw the extension J of piece I upward, and this will cause the pin K, which lies in slot F', to lift the segment F sufficiently far to disengage the teeth $f$ from the end of the arm H, and at the same time the piece I will turn upon its pivot $i$ until the pin $i'$ in the lower end of piece I strikes the other end of the slot $h$, all as clearly represented in Fig. 2, wherein the position of parts are clearly shown, with the segment F lifted above the upper point of arm H, and therefore the parts disengaged from each other, so that the mechanism is unlocked and the brake is released. Accordingly in the manipulation of this mechanism the operator to lock the devices needs simply to thrust his lever in one direction, and to unlock them all he has to do is to throw his lever in the other direction.

Having thus described my invention, what I claim as new, and desire to secure by Letters Patent, is—

1. The herein-described pawl-and-ratchet mechanism for locking and unlocking brakes or similar purposes, which consists, essentially, of a movable pawl-arm, a pivotal toothed and slotted segment engaged thereby, and a piece pivoted to the pawl-arm and having a pin that enters the slot in the segment, substantially as described.

2. The herein-described locking attachment for wagon-brakes and other devices, consisting of the rock-shaft, a pawl-arm secured rigidly thereon, a pivotal toothed and slotted segment engaged by the pawl-arm, a slotted bar which incloses the segment and has a pin entering the slot therein, said bar being pivoted to the pawl-arm and provided at its lower end with a pin entering the slot in said arm, substantially as described.

3. The combination of the pawl-arm, a pivoted and toothed segment provided with a longitudinally-curved slot, and a slotted or forked bar embracing the segment and the pawl, said bar being provided with a pin working in a slot and passing through the slot in the segment, and being likewise pivoted to the pawl and provided at its lower end with a pin working in a slot in said pawl, said bar being also furnished with an arm, substantially as described.

4. The combination of the pawl H, the segment F, having slot F' and teeth $f$, the slotted bar I, pivoted to pawl H and having pin $i'$ entering slot $h$ in pawl H, and provided likewise with pin K, entering slot F' of segment F, and the handle M, connected to bar I, substantially as described.

5. The combination of rock-shaft C, brake-bar D, having shoes $d$, connecting-rod E between rock-shaft and brake-bar, pawl H, rigid on rock-shaft, pivoted and slotted toothed segment F, and the handle-provided slotted bar I, which is pivoted to pawl H and provided with a pin entering the slot in the segment, substantially as described.

In testimony whereof I affix my signature in presence of two witnesses.

GEORGE R. ROGERS.

Witnesses:
CHAS. L. GOODBOR,
JAS. C. KNOX.